(12) United States Patent
Cheenath

(10) Patent No.: US 7,580,975 B2
(45) Date of Patent: *Aug. 25, 2009

(54) ASYNCHRONOUS WEB SERVICE INVOCATION MODEL

(75) Inventor: Manoj Cheenath, San Ramon, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/684,512

(22) Filed: Mar. 9, 2007

(65) Prior Publication Data

US 2007/0150303 A1 Jun. 28, 2007

Related U.S. Application Data

(63) Continuation of application No. 10/348,515, filed on Jan. 21, 2003, now Pat. No. 7,206,807.

(51) Int. Cl.
G06F 13/00 (2006.01)
(52) U.S. Cl. ..................................... 709/203
(58) Field of Classification Search ................ 709/203
See application file for complete search history.

(56) References Cited

U.S. PATENT DOCUMENTS 6,728,960 B1 4/2004 Loomans
7,254,601 B2 * 8/2007 Baller et al. ................ 709/200
2004/0078486 A1 * 4/2004 Salahshoor et al. ......... 709/245

OTHER PUBLICATIONS

Tanenbaum, Andrew S., "Structured Computer Organization," Prentice-Hall, Inc., Englewood Cliffs, NJ, Second Edition, pp. 11-12 (1984).
Rosenberg, Jerry M., Ph.D., "Dictionary of Computers, Information Processing, and Telecommunications," John Wiley and Sons, New York, NY, 2nd Edition, p. 31 (1987).
Bea Systems, Inc., "Invoking WebLogic Web Services," http://e-docs.bea.com/wls/docs61/webServices/client.html, pp. 1-18 (2001).

* cited by examiner

*Primary Examiner*—Robert B Harrell
(74) *Attorney, Agent, or Firm*—Fliesler Meyer LLP (57) ABSTRACT

A system and method for asynchronously invoking a remote web service on a server by application code residing on a client. The web service invoke request received from application code residing on the client, passes an invoke request to a web service residing on a server, receives a result from the web service, the result relating to the invoke request passed by the client, and transmits the result to the application code. Once the invoke request is passed to the web service by the client, the application code is freed to perform other tasks. The result may be transmitted to the application code from the client as part of a call back object passed to the client by the application code, as a result of application code polling of the client, or by the application code ending the task generated by the client.

14 Claims, 5 Drawing Sheets

ASYNCHRONOUS WEB SERVICE INVOCATION MODEL

CLAIM OF PRIORITY

This application claims priority to and is a continuation of U.S. patent application Ser. No. 10/348,515, filed on Jan. 21, 2003, entitled ASYNCHRONOUSLY INVOKING A REMOTE WEB SERVICE ON A SERVER BY A CLIENT WHO PASSES ON A RECEIVED INVOKE REQUEST FROM APPLICATION CODE RESIDING ON THE CLIENT, now U.S. Pat. No. 7,206,807, issued Apr. 17, 2007, which is incorporated herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to remote web services, and more particularly to asynchronously invoking a remote web service.

BACKGROUND OF THE INVENTION

Java standards for web services are constantly being developed. Concurrently, businesses are building important applications on top of web services infrastructures, such as that available in WebLogic Server from BEA Systems of San Jose, Calif. As these applications evolve, they become more complex with more operations to perform.

Figure 1:
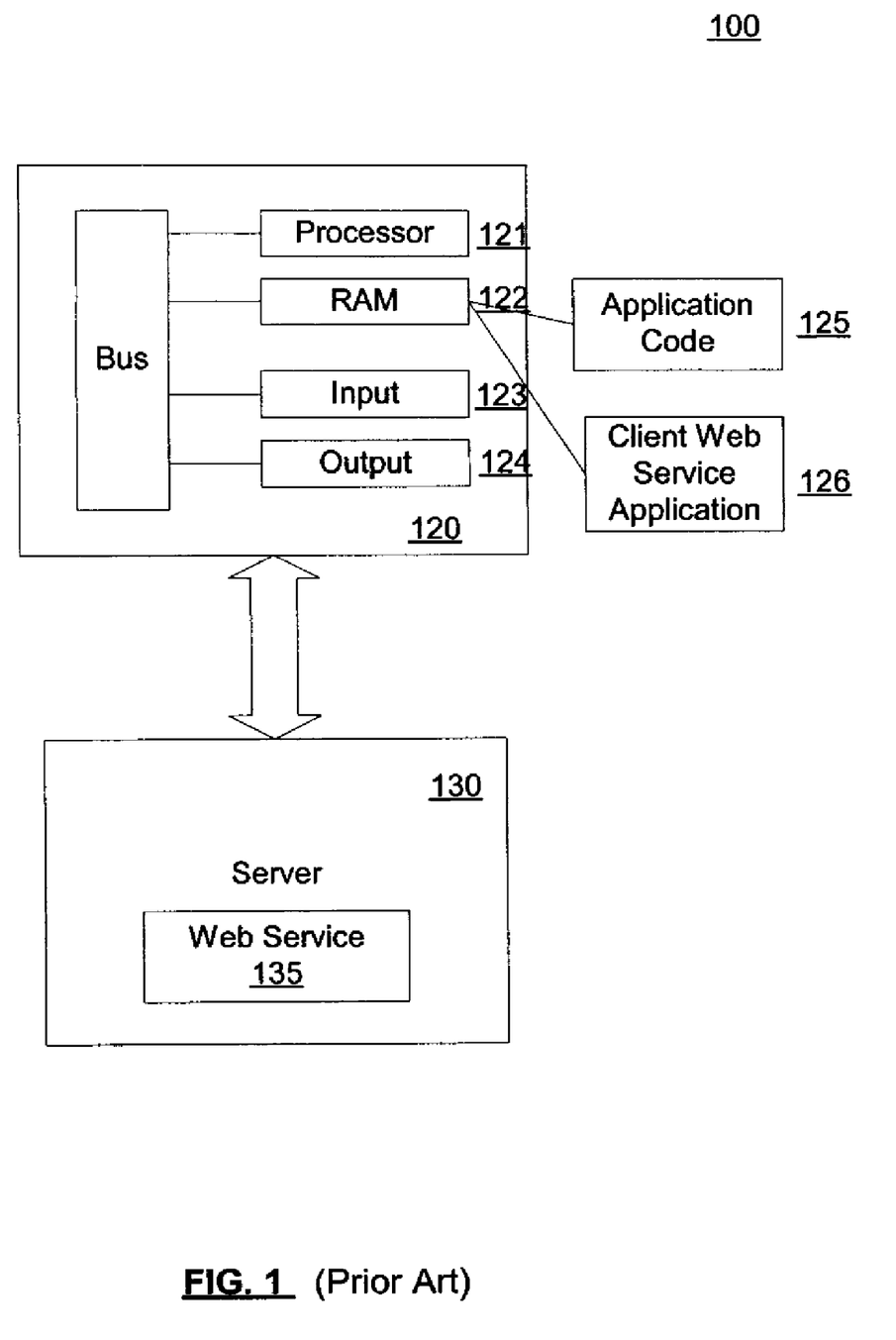
FIG. 1 is an illustration of a prior art system for providing access to a remote web service by a user in accordance with one embodiment of the present invention.

A prior art system illustrating a client-server system is illustrated in FIG. 1. A typical web service 135 residing on a server 130 may be accessed by a client 120. The client may be implemented as a stand alone machine that communicates with the server over a physical connection or a logically implemented client that resides on the same machine as the server. If implemented on a stand alone machine, the client includes a processor 121, RAM 122, input means 123 and output means 124. In either embodiment, the client is configured to include vendor-added application code 125 as well as standard JAVA objects such as client web service applications 126 such as client web service Runtime. The server 130 includes a web service 135. A user may invoke the web service 135 through the client 120.

Figure 2:
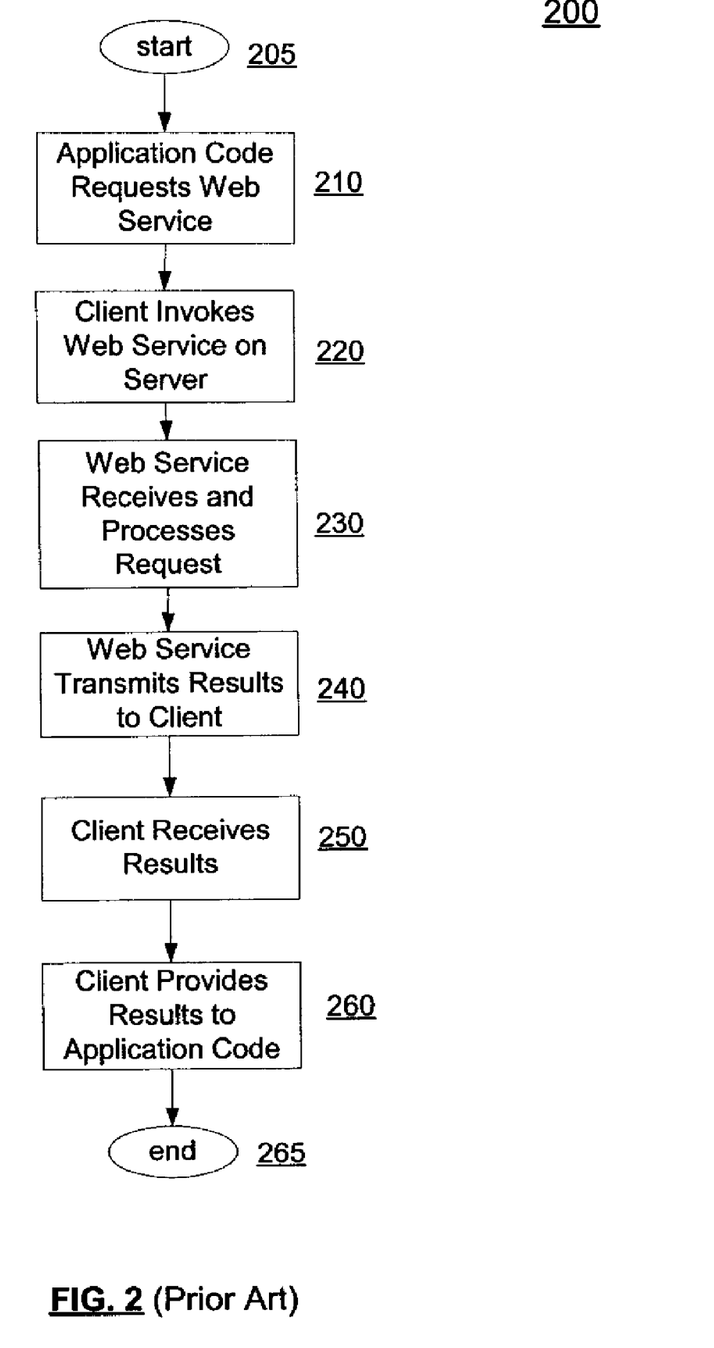
FIG. 2 is an illustration of a prior art method for providing synchronous invocation of a remote web service.

FIG. 2 illustrates a method 200 for invoking a web service in accordance with one embodiment of the present invention. Operation of method 200 begins with start step 205. Application code requests a web service at step 210. In one embodiment, application code residing within the client initiates a call to the client's runtime routine to request a web service residing on a server. This may be initiated by a user or other code within the client. Next, the client invokes the web service on the server in step 220. The invocation request initiates the generation of an application thread by runtime in which the request is carried out. The server receives the request and processes the request at step 230. Next, the server returns a result to the client at step 240. The client receives the result in step 250 and provides the application code with the result at step 260. The thread is then complete and operation of method 200 then ends at step 265. Throughout steps 220-260, the synchronized operation initiated by the application code is performed within a single thread. Thus, the synchronized operation involves the application code waiting for a response from the client before performing other tasks. Thus, the thread is blocked until the web service invoke is complete. An Enterprise Java Bean (EJB) does not allow application code to create new threads. As a result, the method currently used by client server systems to process user requests is slow and inefficient.

What is needed is a web service invocation model that allows a user to perform other tasks while a request is being processed.

SUMMARY OF THE INVENTION

The present invention provides asynchronous remote web service invocation. A system in accordance with one embodiment of the present invention includes a client and a remote server. Invocation of a web service on the server by the client is initiated from an application thread. This application thread is then freed by the client web service runtime to allow the application to process other tasks while the web service is invoked. In one embodiment, asynchronous web service invocation for a system in Java is implemented by freeing the thread used by the application to invoke the web service. Once the first thread is free, the application code may perform other tasks while the second thread carries out the web service invocation. Results from the invoked remote web service are transmitted to the client.

DETAILED DESCRIPTION

The present invention provides asynchronous remote web service invocation. A system in accordance with one embodiment of the present invention includes a client and a remote server. Invocation of a web service on the server by the client initiates an application thread. The application initiated thread is used to access the web service. The user generated thread is then freed to allow the application to process other tasks while the web service is invoked. In one embodiment, asynchronous web service invocation for a system in Java is implemented by freeing the thread initiated by the application to invoke the web service. In one embodiment, the client web service run time frees the first thread and uses a second thread to carry out the web service invocation. Once the first thread is free, the application code may perform other tasks while the second thread carries out the web service invocation. Results from the invoked remote web service are transmitted to the client.

Figure 3:
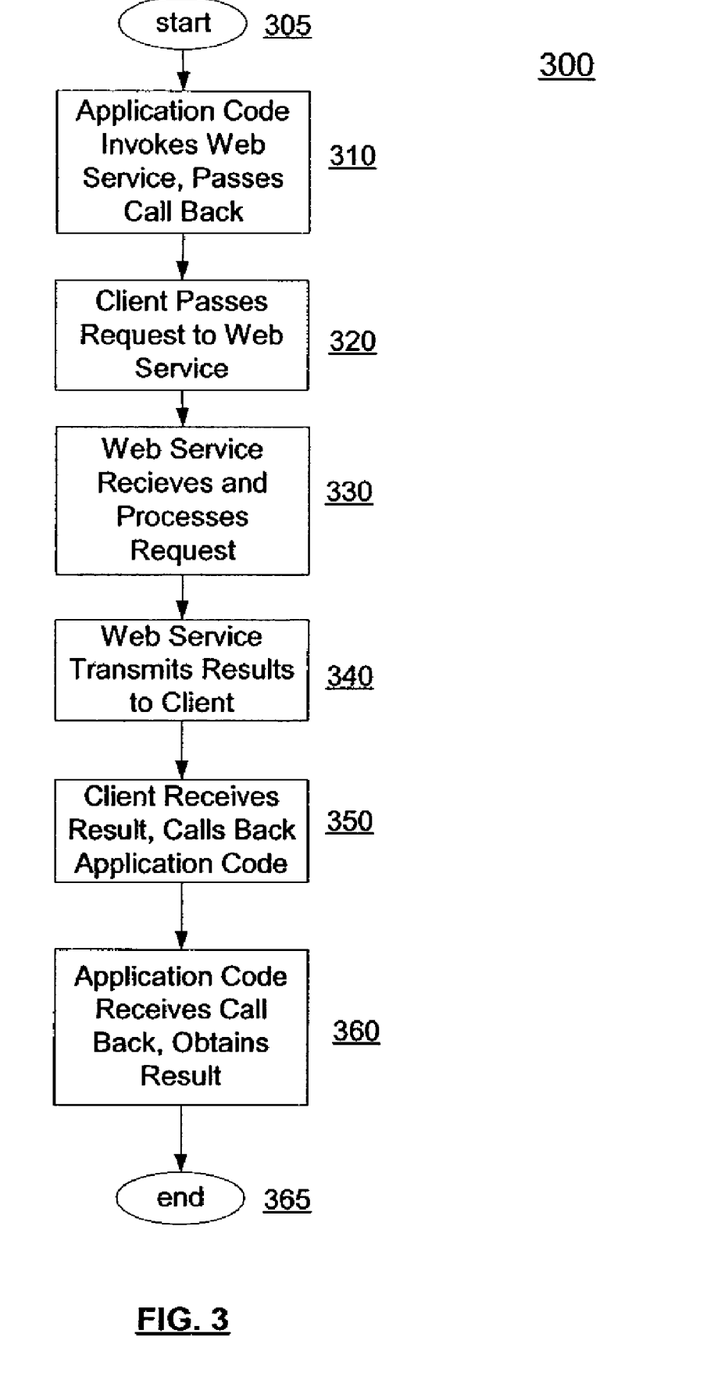
FIG. 3 is an illustration of a method for providing asynchronous invocation of a remote web service using a callback technique in accordance with one embodiment of the present invention.

A method 300 for providing asynchronous invocation of a remote web service using a call back technique in accordance with one embodiment of the present invention is illustrated in FIG. 3. Operation of method 300 begins with start step 305. Application code invokes a web service and passes a call back parameter to the client in step 310. During the invocation of the web service by the application code, the client web service Runtime Routine generates a first thread to carry out the invocation. The application code may be located on a stand alone client machine or implemented logically as discussed above in reference to FIG. 1. In one embodiment, the application code creates an async context and passes a call back object to the client as part of asynch context creation. The async context may contain information. A start method call made subsequently by the client may include the asynchronous context (AC) and arguments.

In step 320, the client passes a request to the web service. In one embodiment, passing a request to the webservice includes invoking an operation to access the remote web service by generating a second thread while the first application thread is freed. Freeing the first application thread allows the user to process other tasks instead of waiting to receive the result from the web service invocation. In one embodiment, a call is made to the asynInvoke method on the client stub. The operation then sends a message to a client dispatcher located on the client. The client dispatcher then creates a FutureResult object, the object to be sent back to the user, creates a task, and schedules this task to the thread pool. The created task includes sending a request to the web service and receiving a result from the web service. Scheduling a task to the thread pool allows a second thread to handle execution of the task. The task is then executed by calling a method of the web service. The second thread processes the call that invokes the task. The task uses a protocol binding to transmit the task request data over a network to a web service for processing.

The Web service located on the server receives and processes the request at step 330. Processing the request includes invoking the requested web service and obtaining a result. The server will use the parameters passed by the client, if any, to obtain a result from the web service. Once the remote method of the web service has been invoked and a result is generated, the result is transmitted by the web service back to the client at step 340. In one embodiment, the result is received by the protocol binding. The task then sets the future result value to the value of the result received from the web service.

The client receives the result and invokes a call back to the application code at step 350. In one embodiment, the call back indicates the result is available at the client for the application code to access. In one embodiment, this includes the web service client runtime initiating the context to notify any listening entities.

The application code receives the call back and obtains the result from the client at step 360. In one embodiment, the application code accesses the web service client runtime and retrieves stored FutureResult value. In yet another embodiment, the client invokes the client stub. The client stub then retrieves the future result from the client and provides the application code with the result. Operation of method 300 then ends at step 355.

An example of application code that may be used to implement the method of FIG. 3 along with client code (not shown) is shown below.

```
public class Main{
    public void test ( ) throws Exception{
        SimpleTest echoService = new SimpleTest_Impl ( );
        SimpleTestSoap echoPort = echoService.getSimpleTestSoap ( );
{ / /callback style
    WSContext wsContext = new WSContext ( );
    wsContext.setResultListener( new ResultListener ( ) {
        public void onCompletion ( InvokeCompletedEvent event ) {
            SimpleTestSoap source = (SimpleTestSoap) event.getSource (
            );
            try{
                String result = source.endEchoString(
            event.getFutureResult ( ) );
                weblogic.utils.Debug.say ( Acallback result: @ +
            result );
                gotCallback = true;
            }catch ( RemoteException e ) {
                e.printStackTrace ( System.out );
            }
        }
    });
    echoPort.startEchoString ( A94501", wsContext );
}
```

Figure 4:
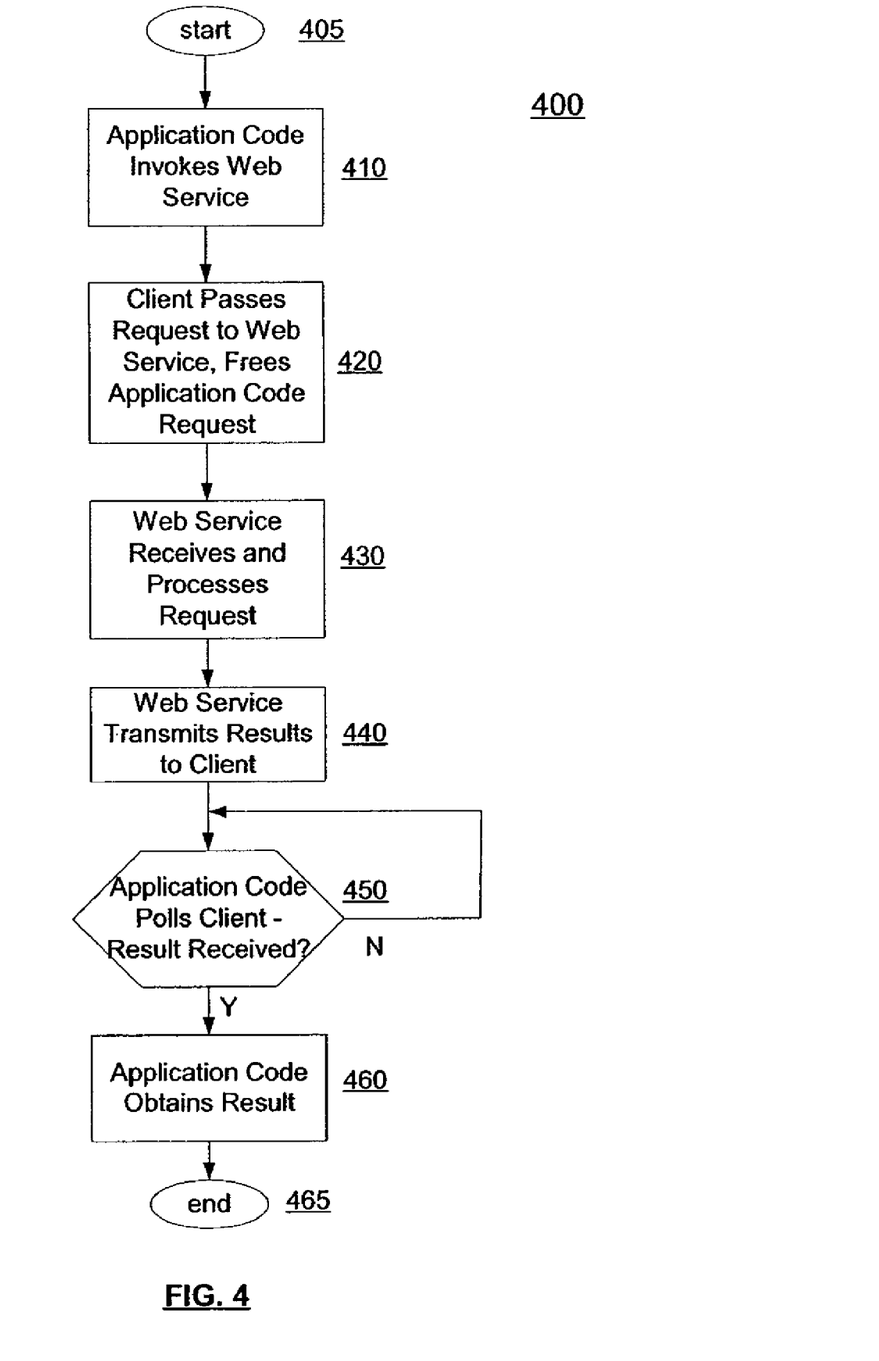
FIG. 4 is an illustration of a method for providing asynchronous invocation of a remote web service using a polling technique in accordance with one embodiment of the present invention.

In another embodiment of the present invention, a polling technique may be used to asynchronously invoke a remote web service. A method 400 for providing asynchronous invocation of a remote web service using a polling technique in accordance with one embodiment of the present invention is illustrated in FIG. 4. Operation of method 400 begins with start step 405. Application code invokes a web service in step 410. In one embodiment, application code invokes a call to remote method of a remote web service in step 410. In contrast to the call back technique of method 300 in FIG. 3, no call back is passed with the remote method call. As in method 300, the web service client runtime generates a thread upon the invocation request by the application code. The web service invocation may be initiated by a user action at a console, on a graphical user interface, or by application code. The application code may be located on a remote or logically implemented client. In one embodiment, the application code creates an async context and calls a start method. The start method call may include the asynchronous context (AC) and arguments.

Next, the client calls a remote method of the web service and passes the request to the web service in step 420. In this embodiment, the client invokes an operation using a second thread while freeing the first thread associated with the application code. Freeing the first thread allows the user to process other tasks instead of waiting to receive the result from the web service invocation. In one embodiment, calling a remote method includes calling an asynInvoke operation on the client stub. The operation then sends a message to a client dispatcher located on the client. The client dispatcher then creates a FutureResult object, the value to be sent back to the user, creates a task, and schedules this task to the thread pool. The created task includes sending a request to the web service and receiving the result of the remote method from the web service. Scheduling a task to the thread pool allows a second thread to handle execution of the task. The task is then executed using an execute call. The second thread processes the execute command that invokes the task. The task uses a protocol binding to send the result back to the client. The binding issued to transmit the task over a network to a web service for processing.

The server receives and processes the request to obtain a result at step 430. After the server obtains a result, the server sends the result to the client, as shown in step 440. In one embodiment, the result is received by the client binding. The task then sets a future result object with the value received from the web service. The application code then polls the client Runtime to determine if the client has received a result from the server in step 450. If the client indicates it has not received a result from the server, operation loops back to step 450 where the application code continues to poll the client. In one embodiment, the user will poll the client at some interval of time after the previous poll. If the client indicates it has received a result from the server, operation continues to step 460. In step 460, the user obtains the result from the client runtime Operation of method 400 then ends at step 465. In another embodiment, the poll of step 460 occurs at some other point during operation of method 400 than after step 450. For example, the polling step may occur immediately after the client passes the request to the web service.

An example of application code that may be used to implement the method of FIG. 4 is shown below.

```
public class Main{
    public void test ( ) throws Exception{
        SimpleTest echoService = new SimpleTest_Impl ( );
        SimpleTestSoap echoPort = echoService.getSimpleTestSoap ( );
{ / /async poll style
        FutureResult futureResult = echoPort.startEchoString( A94501", null );
        while ( !futureResult.isCompleted ( ) ) {
            weblogic.utils.Debug.say ( Aasync polling ...@ );
            // other tasks performed by the application code here. . .
        }
        String result = echoPort.endEchoString ( futureResult );
        weblogic.utils.Debug.say ( Apoll result: @ + result );
}
```

Figure 5:
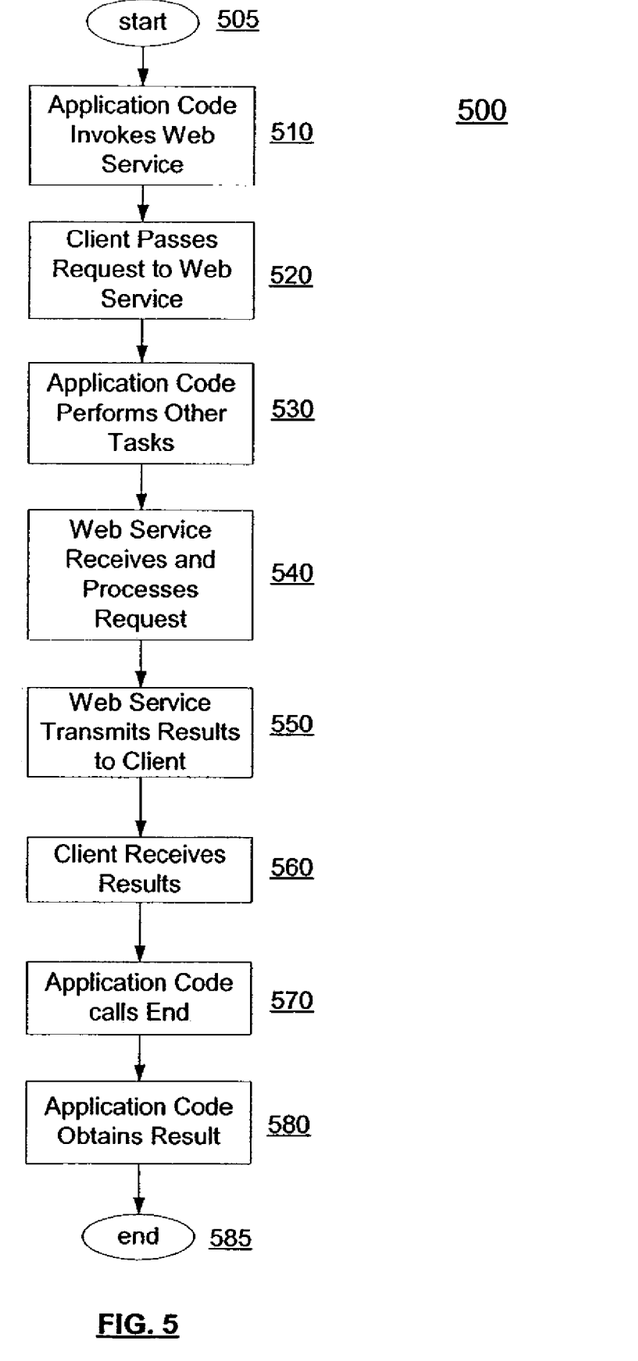
FIG. 5 is an illustration of a method for providing asynchronous invocation of a remote web service using a delayed end call technique in accordance with one embodiment of the present invention.

In another embodiment of the present invention, a delayed end call technique may be used to asynchronously invoke a remote web service. In this embodiment, an end method may be called to obtain the result from an asynchronous invocation. A method 500 for providing asynchronous invocation of a remote web service using a static end technique in accordance with one embodiment of the present invention is illustrated in FIG. 5. Operation of method 500 begins with start step 505. Application code invokes a remote web service in step 510. As in methods 300 and 400, the invocation request by the application code requires the generation of a first thread to process the request. The web service invocation may be initiated by a user action at a console, on a graphical user interface, or by application code. The application code may be located on the client computer or on some other system or machine. In one embodiment, the application code creates an async context and calls a start method. The start method call may include the asynchronous context (AC) and arguments.

Next, the client passes the request to the web service in step 520. In one embodiment, the client invokes an operation to access the remote web service in step 520. In this embodiment, the client invokes an operation using a second thread and passes arguments needed to invoke the web service. The arguments may have been generated from the application code or the client itself. Invoking an operation may include the client stub calling an asynInvoke operation. The operation then sends a message to a client dispatcher located on the client. The client dispatcher then creates a FutureResult value, the value to be sent back to the application code, creates a task, and schedules the task to the thread pool. The created task includes sending a request to the web service and receiving a result from the web service. Scheduling a task to the thread pool allows a second thread to handle execution of the task. The task is then executed using an execute command.

The second thread processes the execute command that invokes the task. The task is then sent to the client binding. The binding sends the task over a network to a web service for processing.

After the client passes the request to the web service in step 520, the application code may perform other tasks at step 530. These other tasks will include tasks performed by the application code that do not require a result from the invoked web service. Though listed as step 530 in method 500 of FIG. 5, the other tasks may be performed at any time after the start call is made in step 510 and the end call is made in step 570.

After the application code has made a start call, the web service located on the server receives and processes the request in step 540. Processing the request includes generating a result from the web service. The web service then transmits the result to the client in step 550. The client receives the result in step 560. In one embodiment, the result is received by the binding. The task created earlier then sets FutureResult to the value of the result received from the web service.

At some point before the application code requires the result, the application code will invoke endXXX( ) to end the first thread, as shown in step 570. The end call serves to end the first thread. In step 580, the application code obtains the FutureResult from the client. Operation of method 500 then ends at step 585. An example of user code that may be used to implement the method of FIG. 5 is shown below.

```
public void test ( ) throws Exception{
    SimpleTest echoService = new SimpleTest_Impl ( );
        SimpleTestSoap echoPort = echoService.getSimpleTestSoap ( );
    {/ / sync invoke using async style
        FutureResult futureResult = echoPort.startEchoString
            ( A94501", null )=
        // other tasks performed by the application code here. . .
        String result = echoPort.endEchoString ( futureResult );
        weblogic.utils.Debug.say ( Async result:@ + result );
    }
```

In one embodiment of the invention, the systems illustrated in FIGS. 3, 4 and 5 may be a request-response service. In a request-response service, the client sends a request to a server and receives a response from the server over the same socket connection. In another embodiment of the present invention, a server may send the result back to the client on a second socket connection that differs from the line the request was received on by the server. In this embodiment, the thread driving the request is free when the client sends the request to the server. Once the request is processed and a result is obtained by the server, the server uses a new thread to drive the transmittal of the result back to the client. Since the first thread is freed when the client sends the request, the user is free to process other tasks. The user is not restricted from doing other tasks while waiting to receive the result from the web service. The systems illustrated in FIGS. 3, 4 and 5 may be used to implement a system with a server having two one-way transmissions.

In one embodiment of the present invention, asynchronous web service invocation is enabled when an attribute generateAsyncMethods in clientgen task is set to true. This will generate a client stub with asynchronous web invocation methods that start and stop the asynchronized invocation.

The present invention provides asynchronous remote web service invocation. A system in accordance with one embodiment of the present invention includes a client and a remote server. Invocation of a web service on the server by the client initiates an application thread. The application initiated thread to access the web service. The user generated thread is then freed to allow the application to process other tasks while the web service is invoked. In one embodiment, asynchronous web service invocation for a system in Java is implemented by freeing the thread initiated by the application to invoke the web service. In one embodiment, the client web service run time frees the first thread and uses a second thread to carry out the web service invocation. Once the first thread is free, the application code may perform other tasks while the second thread carries out the web service invocation. Results from the invoked remote web service are transmitted to the client.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing at least one of additive model representation and reconstruction.

Included in the programming (software) of the general/specialized computer or microprocessor are software modules for implementing the teachings of the present invention, including, but not limited to, separating planes of a source image, averaging at least one of foreground and background colors, replacing colors, and compensating for error introduced by color replacement in one plane by feeding error into a second plane, storage, communication of results, and reconstructing an image according to the processes of the present invention.

What is claimed is:

1. A system for asynchronous invocation of web services in a distributed network, said system comprising:
 a client connected to the distributed network and having an application executing thereon, said application having generated a web service request in a first thread, wherein a future result object and a task are created by said client, said future result object being stored on a computer readable medium, wherein said client schedules the task to a thread pool and transmits the web service request to a web service and releases said first thread such that the application is enabled to perform one or more other tasks while the web service request is processed, wherein said one or more other tasks are executed independently of a result of said web service request; and
 a server connected to the distributed network and having the web service deployed thereon, wherein said server receives the web service request from the client, processes said web service request and obtains the result of said web service request;
 wherein said application periodically queries the future result object for said result of the web service request and retrieves the result of said web service request upon receiving an indication that said result of said web service request is available, wherein if the future result object indicates that the result of said web service request has not been received from the server, the application continues to poll the future result object at an interval of time after the previous poll.

2. The system according to claim 1, further comprising:
 a first socket connection over which the web service request is transmitted from the client to the server.

3. The system according to claim 2, further comprising:
 a second socket connection over which the result of said web service request is transmitted from the server to the client wherein said second socket connection differs from said first socket connection.

4. The system according to claim 1 wherein transmitting the web service request by the client to the web service residing on server further includes:
 generating a second thread to process the task scheduled by the client, the task configured to handle invoking the web service, wherein said first thread is released upon the generation of the second thread.

5. The system according to claim 1 wherein periodically querying for said result of the web service request and retrieving the result of the web service request by the application further includes:
 notifying the application that the result of the web service request is available;
 receiving a result request from the application code; and
 transmitting the result of the web service request to the application code.

6. The system according to claim 1 wherein generating the web service request in the first thread by the application further includes:

passing a call back parameter by the application to the client as part of an asynchronous context creation.

7. The system according to claim 1 wherein the web service request is initiated by at least one of:
a user action at a console, a user action on a graphical user interface (GUI), and by application code.

8. A method for asynchronously invoking web services in a distributed network, said method comprising:
generating a web service request in a first thread by an application residing on a client in said distributed network;
creating a future result object to allow the first thread to be released and creating a task, wherein said future result object being stored on a computer readable medium;
scheduling the task to a thread pool by the client wherein the task includes transmitting the web service request by the client to a web service residing on a server;
assigning a second thread to process the task scheduled by the client, wherein the task handles invoking the web service request;
releasing the first thread such that said application is enabled to perform one or more other tasks while the web service request is carried out, wherein said one or more other tasks are executed independently of a result of said web service request;
processing the web service request by the web service residing on said server and obtaining the result of said web service request, the result of said web service request relating to the web service request passed by the application residing on the client, wherein the task sets the future result object with the result of said web service request received from the web service;
polling the future result object for said result of the web service request by the application to determine if the result of said web service request has been received by the client from the web service; and
retrieving said result of the web service request by the application from the future result object upon receiving an indication that said result of said web service request is available, wherein if the future result object indicates that the result of said web service request has not been received from the server, the application continues to poll the future result object at an interval of time after the previous poll.

9. The method according to claim 8 wherein transmitting the web service request by the client to the web service residing on the server further includes:
transmitting the web service request over a first socket connection.

10. The method according to claim 9 wherein the server transmits the result of said web service request to the client on a second socket connection that differs from said first socket connection.

11. The method according to claim 8 wherein polling the future result object for said result of the web service request by the application to determine if the result of the web service request has been received by the client from the web service, further includes:
notifying the application that the result of said web service request is available;
receiving a result request from the application code; and
transmitting the result of said web service request to the application code.

12. The method according to claim 8 wherein generating the web service request in the first thread by the application further includes:
passing a call back parameter by the application to the client as part of asynchronous context creation.

13. The method according to claim 8 wherein the web service request is initiated by at least one of:
a user action at a console, a user action on a graphical user interface (GUI), and by application code.

14. A computer readable storage medium having instructions stored thereon which when executed by one or more processors cause a system to:
generate a web service request in a first thread by an application residing on a client in a distributed network;
create a future result object to allow the first thread to be released and creating a task, wherein said future result object being stored on the computer readable storage medium;
schedule the task to a thread pool by the client wherein the task includes transmitting the web service request by the client to a web service residing on a server;
assign a second thread to process the task scheduled by the client, wherein the task handles invoking the web service request;
release the first thread such that said application is enabled to perform one or more other tasks while the web service request is carried out, wherein said one or more other tasks are executed independently of a result of said web service request;
process the web service request by the web service residing on said server and obtaining the result of said web service request, the result of said web service request relating to the web service request passed by the application residing on the client, wherein the task sets the future result object with the result of said web service request received from the web service;
poll the future result object for said result of the web service request by the application to determine if the result of said web service request has been received by the client from the web service; and
retrieve said result of the web service request by the application from the future result object upon receiving an indication that said result of said web service request is available, wherein if the future result object indicates that the result of said web service request has not been received from the server, the application continues to poll the fixture result object at an interval of time after the previous poll.

* * * * *

UNITED STATES PATENT AND TRADEMARK OFFICE
CERTIFICATE OF CORRECTION

| | | |
|---|---|---|
| PATENT NO. | : 7,580,975 B2 | Page 1 of 1 |
| APPLICATION NO. | : 11/684512 | |
| DATED | : August 25, 2009 | |
| INVENTOR(S) | : Manoj Cheenath | |

It is certified that error appears in the above-identified patent and that said Letters Patent is hereby corrected as shown below:

In column 3, line 21, delete "webservice" and insert -- web service --, therefor.

In column 8, line 51, in claim 4, delete "on server" and insert -- on the server --, therefor.

In column 10, line 55, in claim 14, delete "fixture" and insert -- future --, therefor.

Signed and Sealed this

Twenty-ninth Day of June, 2010

David J. Kappos
*Director of the United States Patent and Trademark Office*